Patented Mar. 23, 1954

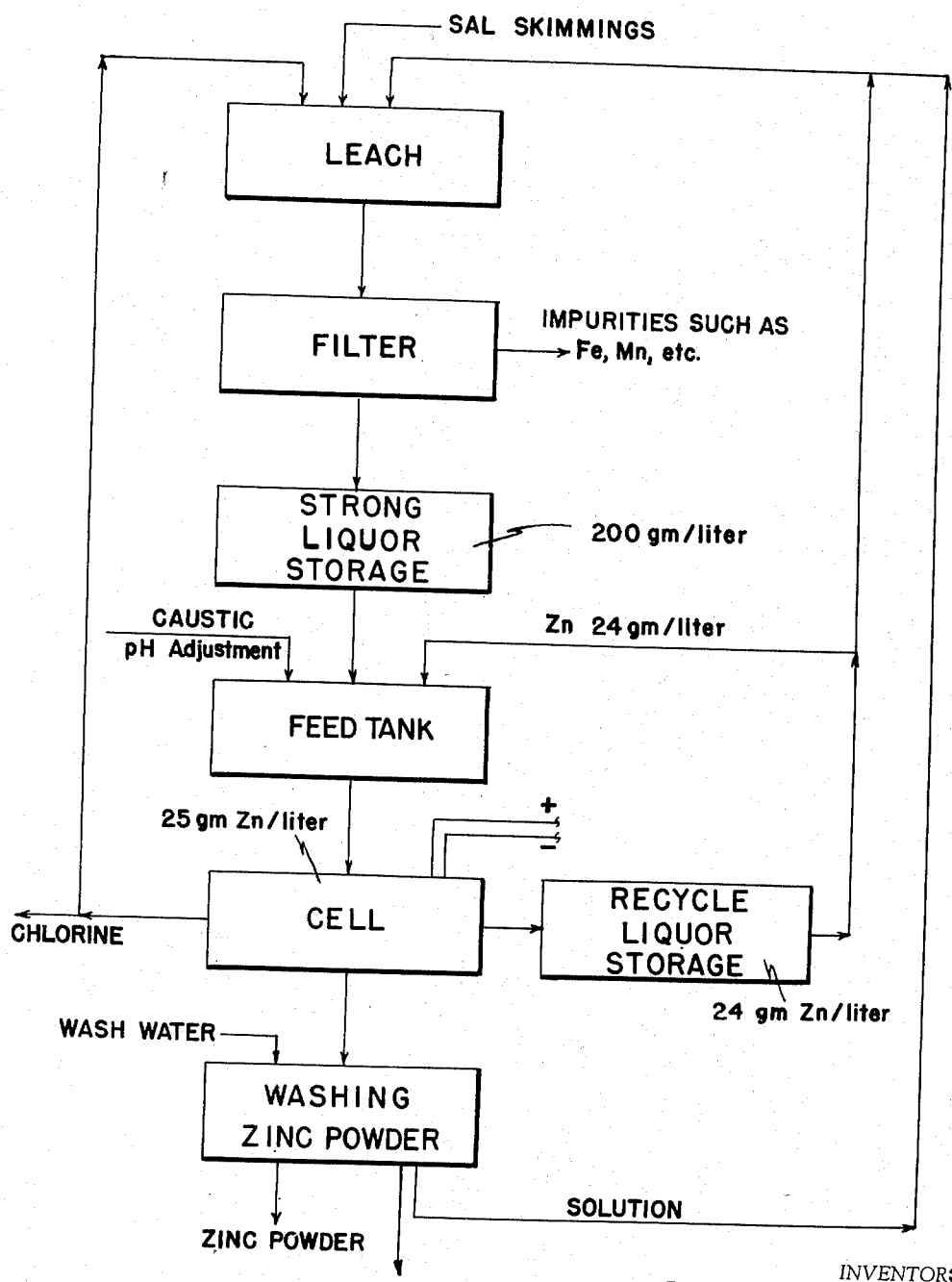

2,673,179

UNITED STATES PATENT OFFICE 2,673,179

PROCESS FOR THE RECOVERY OF ZINC

Daniel W. Duncan, Portsmouth, and Peter Eustis, Norfolk County, Va.

Application September 1, 1950, Serial No. 182,652

3 Claims. (Cl. 204—10)

This invention relates to a process for the recovery of zinc and more particularly to a process for recovering zinc powder and chlorine from zinc-bearing raw materials contaminated with chlorine.

In the treatment of zinc-bearing raw materials for the recovery of zinc the presence of chlorine in the raw materials has heretofore been considered extremely undesirable. If the raw materials are roasted in the conventional manner, the presence of chlorine seriously increases the corrosion of the roasting equipment. In addition, the chlorides being volatile result in the liberation of gases which constitute a serious health hazard and loss of valuable material.

One raw material constituting a desirable source of relatively large quantities of zinc is sal skimmings from hot dip galvanizing processes. These skimmings contain primarily metallic zinc, zinc oxide and zinc chloride in addition to small amounts of impurities. The demand of the zinc industry for raw materials containing low chlorine concentrations is emphasized by a penalty in the form of a lower price for materials containing more than 2% chlorine as compared with skimmings containing less than 2% chlorine. Further price penalties are imposed as the chlorine concentration is increased above other specifications set by the industry.

It is an object of this invention to provide a method of recovering zinc from zinc-bearing raw materials contaminated with chlorine.

A further object of this invention is to provide a process allowing the recovery of chlorine gas as a salable product from zinc-bearing raw materials contaminated with chlorine and thereby avoid the problem of disposing of undesirable chlorides.

Another object of this invention is to provide a process for the recovery of zinc in the form of an electrolytic powder from chlorine contaminated zinc-bearing materials.

Still another object of this invention is to provide a process for the production of zinc powder which utilizes low cost raw materials.

It is also an object of this invention to provide an electrolytic process for the recovery of zinc in which an acidic material of sufficient strength to provide an effective leach for the raw materials is liberated at the anode of the electrolytic cell.

With these and other objects in view as will become apparent in the following detailed description, this invention resides in a process in which chlorine contaminated zinc-bearing raw materials are leached to form a strong liquor for addition to the electrolyte of an electrolytic cell through which a current is passed to deposit zinc powder at the cathode and release products from the anode which are utilized for leaching the zinc-bearing raw materials.

The single figure of the drawing is a flow sheet illustrating a preferred embodiment of this invention showing typical concentrations and operating conditions.

One preferred raw material for use in the process of this invention is sal skimmings from hot dip galvanizing. This material contains zinc in the form of metallic zinc, zinc oxide and zinc chloride and may contain 35% chlorine or even more. Ordinarily the chlorine content of the skimmings will range from about 10 to 35% chlorine. Galvanizing skimmings or zinc ash may also be used in this process but the sal skimmings are preferred because of their lower cost and high chlorine content. In general, any zinc-bearing raw material contaminated with chlorine is suitable as a raw material. In the description of this invention sal skimmings are taken as an example of a raw material used but this process is not limited to the treatment of that material.

The sal skimmings are leached with anolyte taken from the anode compartment of the electrolytic cell in which zinc is deposited as powdered zinc metal to form a strong zinc chloride solution. This anolyte, in general, will contain from 15 to 80 grams of zinc per liter in the anolyte in the form of zinc chloride dissolved in an aqueous solution. The anolyte used for leaching the sal skimmings will also contain sodium chloride or other soluble chlorides used to reduce the electrical resistance of the electrolyte employed in the electrolysis of zinc. The sodium chloride, of course, is highly ionized and greatly reduces the resistance of the electrolyte but is also an aid in leaching because of its corrosive effect on the metallic zinc in the sal skimming.

The anolyte used in the leaching contains dissolved chlorine which is liberated in the electrolytic cell in the manner hereinafter described. The dissolved clorine reacts with the water to form hydrochloric and hypochlorous acids which attack the metallic zinc and zinc oxide to form zinc chloride and exert a strong oxidizing effect upon impurities, principally iron and manganese, in the sal skimmings.

The strong solution from the leaching operation may contain a high concentration of zinc, in the form of dissolved zinc chloride, for example 200 grams of zinc per liter. The iron and manganese are oxidized by the chlorine to precipitate solid materials which may easily be separated from the solution, preferably by filtration. The pH of the strong solution discharged from the leaching operation is about 5.5 which is not sufficiently acidic to dissolve the precipitated iron and manganese and allows the removal of those impurities and subsequent production of a pure metallic zinc.

It is preferred to deliver the clarified, strong liquor from the filter to a strong liquor storage vessel to increase the flexibility of the operation. In addition to added flexibility the storage vessel permits better control and uniformity of the composition of the strong liquor and permits periodic leaching of the sal skimmings. The strong liquor is preferably delivered from the storage vessel to a feed tank for the electrolytic cell in which the strong liquor is added to recirculating anolyte from the anode compartment of the cell to reestablish its zinc concentration at the desired level.

The process of this invention is particularly suited for the recovery of zinc in the form of a high grade electrolytic powder. The operation of the electrolytic cell to produce a zinc powder efficient for use in reducing operations with a high current efficiency is described and claimed in our copending application entitled "Process for the Electrolysis of Zinc Chloride Solutions" filed on September 1, 1950, and having Serial No. 182,651.

The mixture of strong liquor and circulating anolyte is delivered from the feed tank into the cathode compartment of an electrolytic cell having insoluble anodes, preferably of graphite, and cathodes of zinc or other suitable material. A porous diaphragm surrounds the anodes to separate the cell into an anode compartment and a cathode compartment to facilitate the collection of chlorine and improve the efficiency of the cell. An electric current is passed through the electrolytic cell to deposit zinc at the cathode and liberate chlorine at the anode.

Typical operating conditions for this invention are indicated on the flow sheet shown in the drawings. For instance, the anolyte delivered to the feed tank may contain 24 grams of dissolved zinc per liter and have a pH of about 4.5. It is mixed with strong liquor to produce an electrolyte for delivery to the cathode compartment of the cell containing about 25 grams of dissolved zinc per liter and having a pH of 4.9. The use of insoluble anodes and the presence of the diaphragm result in a higher acidity of the anolyte, as compared with the electrolyte in the vicinity of the cathodes.

A current density of 25 to 60 amperes per square foot is preferred for the production of zinc powder according to this invention, although current densities varying from 10 to 75 amperes per square foot may be employed. The concentration of zinc in the anolyte may vary from 15 to 80 grams per liter with the preferred range of 20 to 40 grams of zinc per liter. The lower limit of zinc concentration in the anolyte is rather sharply defined as difficulty is encountered with concentrations of 18 grams per liter and satisfactory operation cannot be maintained at concentrations below 15 grams per liter. While the temperature of the cell may vary as widely as 15 to 90° C., the preferred range of operation is 20 to 60° C. It is preferred that the pH of the solution in the cathode compartment of the cell remain between the limits of 4.8 and 5.3, but the pH may be as low as 4.4 or as high as 5.8. As mentioned above, sodium chloride or other soluble metallic chlorides are added to the electrolyte to improve its conductivity. The sodium chloride concentration may range up to saturation, approximately 330 grams per liter, and in general about 300 to 330 grams per liter of electrolyte will be employed.

It will be appreciated that the variables and operating conditions mentioned above are interdependent and that a change in one of the variables may necessitate a change in the other conditions if maximum efficiency of operation is to be maintained. The limits set forth are those within which operations must be kept if satisfactory production of zinc powder is desired.

It has also been found necessary for the efficient production of electrolytic zinc powder to circulate the electrolyte through the cell at a very high rate as compared with electrolytic processes heretofore employed. This circulation is effected by withdrawing anolyte from the anode compartment of the cell and circulating it through the feed tank before returning to the cathode compartment of the cell. A recycle liquor storage tank is provided to improve the flexibility of the recirculating operation and also to permit delivery of the anolyte to the leaching operation periodically.

The actual flow rates employed will depend upon the resistance to flow of the diaphragm. Actually, the pressure drop across the diaphragm provides an indication of whether or not the flow rate is high enough for efficient operation. It is practical to operate with high efficiency with feed solutions having concentrations as high as 35–40 grams of zinc per liter by operating with a diaphragm having relatively high resistance to flow and maintaining a high zinc depletion, for example of 15 to 20 grams per liter.

We prefer to deposit not more than 20 grams of zinc per liter of electrolyte from the solution per pass through the cell. It is not known whether this flow rate is necessary because of depletion of zinc concentrations in the electrolyte in the vicinity of the cathode or if this is merely one of the factors demanding a high rate of circulation. In any event, regardless of the concentration of the electrolyte, the electrolyte should be circulated at a sufficiently high rate to prevent the deposition of more than 20 grams of zinc per liter of electrolyte per pass through the cell; consequently, it is probable that other factors, perhaps the diffusion of chlorine towards the cathode of the cell, require the high rate of circulation.

The high flow rate of the electrolyte through the cell with the consequent low depletion of the zinc content of the electrolyte adds to the stability of operations of the cell. Even if flow of strong liquor into the feed tank should be completely stopped for a short period, the characteristics of the electrolyte delivered to the cell would not be greatly changed. Moreover, the high rate of circulation gives the desired stability of operation with a small total volume of electrolyte.

Chlorine gas is removed from the anode compartment of the cell. Of primary importance is the fact that the chlorine is, in effect, a concentrated acid liberated from the anode of the cell suitable for use in the leaching of the zinc-bearing raw materials. This is particularly important in the production of a zinc powder in which the high rates of circulation of the electrolyte and the corresponding low depletion and small difference in composition of the catholyte and anolyte result in the formation of an anolyte which alone is not suitable for leaching. For example, in the case where the acidic component is not removed as a separate phase, as in the electrolysis of zinc sulfate to produce powder, at one gram per liter depletion, the anolyte would have a sulfuric acid concentration of only 0.15% free acid which would be wholly unsatisfactory for leaching.

A portion of the chlorine and the anolyte is returned to the leaching operation for leaching the sal skimmings, as indicated in the flow sheet. The chlorine is absorbed in the aqueous leaching solution to form a strong oxidizing agent and an acid which leaches and oxidizes the impurities in a single step. Moreover, hydrogen liberation in the leaching operation is minimized with a resultant reduction in danger of explosion. The return of the anolyte to the leaching operation increases the stability of the system inasmuch as the anolyte contains the desired sodium chloride concentration for the electrolyte and the pH of the leaching operation approximates closely the pH of the anolyte.

Zinc powder is taken from the cathode compartment of the cell and scraper from the cathode into a vessel suitable for washing the water. The wash water from the washing operation is returned to the leaching step. Only zinc and chlorine, both valuable products, are removed from the cell.

The process of this invention avoids the health hazard and corrosion problems encountered when chlorine contaminated zinc-bearing raw materials are roasted.

An important advantage of the present process is the liberation of concentrated chlorine gas from the anode which provides an acidic material of sufficient strength to be efficient as a leach for the raw materials. This is particularly important, as discussed above, in the production of zinc powder from chlorine contaminated zinc-bearing raw materials.

While the invention has been described with reference to specific operating conditions, it is not to be limited to those details, and the scope of the invention is defined by the appended claims.

We claim:

1. A process for the preparation of zinc powder from chlorine-containing zinc-bearing materials having present therein free, metallic zinc selected from the group consisting of sal skimmings, galvanizing skimmings and zinc ash comprising leaching the zinc-bearing raw material with an aqueous solution containing dissolved chlorine and sodium chloride to convert the zinc and zinc oxide content thereof into zinc chloride and to oxidize the iron and manganese impurities thereof, maintaining the pH of the solution from about 4.4 to 5.8 selectively to dissolve the zinc chloride therein, separating solid residues from the solution, introducing the zinc chloride solution into the cathode compartment of an electrolytic cell having a permeable diaphragm separating the cathode and anode compartments thereof, passing an electric current through the cell to deposit zinc powder at the cathode and to liberate chlorine at the anode, withdrawing electrolyte from the anode compartment of the cell and recirculating a portion thereof to the cathode compartment in regulated amounts to maintain a positive flow through the cell with a pressure drop of greater than one millimeter of water across the diaphragm therein, combining an increment of the chlorine released at the anode with the remaining portion of the electrolyte removed from the cell to produce the aqueous solution for leaching the zinc-bearing raw material to provide additional quantities of zinc chloride, and recovering the deposited zinc powder from the cathode compartment of the cell.

2. A process for the preparation of zinc powder from chlorine-containing zinc-bearing raw materials having present therein free, metallic zinc selected from the group consisting of sal skimmings, galvanizing skimmings and zinc ash comprising leaching the zinc-bearing raw material with an aqueous solution containing dissolved chlorine and sodium chloride to convert the zinc and zinc oxide content thereof into zinc chloride and to oxidize the iron and manganese impurities thereof, maintaining the pH of the solution from about 4.4 to 5.8 selectively to dissolve therein the zinc chloride, filtering the solution to separate the solid residues including the iron and manganese oxides therefrom, introducing the clarified zinc chloride solution diluted with suitable amounts of anolyte to contain a zinc concentration of from 20 to 40 grams per liter into the cathode compartment of an electrolytic cell having a permeable diaphragm separating the cathode and anode compartments thereof, passing an electric current of from 15 to 70 amperes per square foot through the cell to deposit zinc powder at the cathode and to liberate chlorine at the anode, withdrawing electrolyte from the anode compartment of the cell and recirculating a portion thereof to the cathode compartment in regulated amounts to maintain a positive flow through the cell with a pressure drop of greater than one millimeter of water across the diaphragm therein, combining an increment of the chlorine released at the anode with the remaining portion of the electrolyte removed from the cell to produce the aqueous solution for leaching the zinc-bearing raw material to provide additional quantities of zinc chloride solution, and recovering the deposited zinc powder from the cathode compartment of the cell.

3. A process for the preparation of zinc powder from chlorine-containing zinc-bearing raw materials having present therein free, metallic zinc selected from the group consisting of sal skimmings, galvanizing skimmings and zinc ash comprising leaching the zinc bearing raw material with an aqueous solution of zinc chloride containing dissolved chlorine and sodium chloride in an amount of from 300 to 330 grams of chloride per liter of leaching solution to convert the zinc and zinc oxide content thereof into zinc chloride and to oxidize the iron and manganese impurities thereof, maintaining the pH of the solution at about 5.5 selectively to dissolve therein the newly formed zinc chloride, filtering the solution to separate the solid residues including the iron and manganese oxides therefrom, introducing the clarified zinc chloride solution diluted with suitable amounts of anolyte to contain a zinc concentration of from 20 to 40 grams per liter into the cathode compartment of an electrolytic cell having a permeable diaphragm separating the cathode and anode compartments thereof, passing an electric current of from 15 to 70 amperes per square foot through the cell to deposit zinc powder at the cathode and to liberate chlorine at the anode, withdrawing electrolyte from the anode compartment of the cell and recirculating a portion thereof to the cathode compartment in regulated amounts to maintain a positive flow through the cell with a pressure drop of greater than one millimeter of water across the diaphragm therein, combining an increment of the chlorine released at the anode with the remaining portion of the electrolyte removed from the cell to produce the aqueous zinc chloride solution for leaching the zinc-bearing raw material to provide additional quantities of zinc chloride, and recovering the deposited zinc powder from the cathode compartment of the cell.

DANIEL W. DUNCAN.
PETER EUSTIS.

References Cited in the file of this patent

UNITED STATES PATENTS

| Number | Name | Date |
|---|---|---|
| 546,873 | Ashcroft | Sept. 24, 1895 |
| 2,017,330 | Traphagen | Oct. 15, 1935 |
| 2,313,338 | Hannay et al. | Mar. 9, 1943 |

FOREIGN PATENTS

| Number | Country | Date |
|---|---|---|
| 14,411 | Great Britain | of 1885 |
| 17,205 | Great Britain | of 1889 |
| 22,827 | Great Britain | of 1894 |
| 720,663 | Germany | May 12, 1942 |

OTHER REFERENCES

Electrolytic Deposition and Hydrometallurgy of Zinc by Oliver C. Ralston, McGraw-Hill Book Co., N. Y. 1921. Pages 124–126, 129, 132–134, 138, 140, 187.